June 24, 1941.   W. PAULI ET AL   2,247,065
METHOD OF PURIFYING AND CONCENTRATING CAOUTCHOUC
DISPERSIONS OR THE LIKE
Filed Jan. 4, 1937
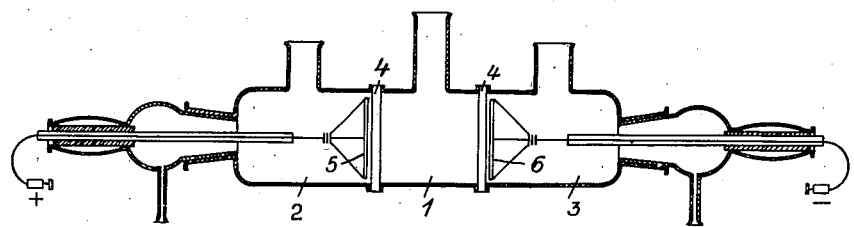
Inventors:
Wolfgang Pauli and Paul Stamberger
Attorneys:

Patented June 24, 1941

2,247,065

UNITED STATES PATENT OFFICE 2,247,065

METHOD OF PURIFYING AND CONCENTRATING CAOUTCHOUC DISPERSIONS OR THE LIKE

Wolfgang Pauli and Paul Stamberger, Vienna, Austria, assignors, by mesne assignments, to the firm Dunlop Plantations Limited, London, England, a company of Great Britain Application January 4, 1937, Serial No. 119,052
In Austria January 11, 1936

4 Claims. (Cl. 204—180)

This invention relates to the purifying and concentrating of caoutchouc emulsions (e. g. latex) and other dispersions containing natural or artificial, vulcanized or non-vulcanized, rubber. The method according to the invention consists in subjecting the dispersion to the action of an electric field, preferably a weak field, and in thus bringing about, a stratified separation of the specifically heavier colloids from the specifically lighter colloids, while retaining the sol character of the dispersion, the sol containing the specifically heavier particles collecting at the bottom, while the sol containing the specifically lighter particles collects at the top, each in a liquid layer with a clearly defined plane of demarkation therebetween. In this manner it becomes possible easily to separate these liquid layers from each other in a purely mechanical way, with the removal first of all either of the upper layer enriched in caoutchouc particles or the proteins and other concomitants collected in the lower layer. Natural or artificial rubber dispersions, for example latex, may thus be freed from undesirable constituents such as for example the proteins and concomitant substances, electrolytes, and the like.

Whereas in electro-dialysis what is aimed at is to remove the diaphragm-traversing electrolytes by means of electric current, and in electro-osmosis to effect dehydration by electric elimination of the water for instance by separating the same from the finely divided matter in suspension therein, the electro-stratification or electro-decantation according to the present invention provides for the conducting away of the sufficiently charged colloidal particles to a diaphragm at which they become highly concentrated in a micro layer and along which they rise or fall according to their specific gravity, and spread out as stable sols on the surface or on the bottom. Deposition in the solid state is not brought about. The separation of the liquid layers is then effected for example by drawing or syphoning them off. An essential feature of the method according to the invention is that the separation of the colloids is effected according to the specific gravities, so that particles of like charge, such as for instance electro-negative colloids, can also be separated in an electric field by this method. This feature distinguishes the present method from all methods of electrophoretic deposition in which the colloids are separated according to whether they are positively or negatively charged and deposited or coagulated at the electrodes.

By the method according to the invention it is possible to obtain highly concentrated caoutchouc sols (latex or the like sols) which are free or almost free of dissolved proteins and electrolytes. A degree of purification corresponding to 1% (one-thousandth part), and even less, of the impurities originally present may easily be attained by this method. In this manner there can be obtained masses which are far less capable of swelling, are of lower electric conductivity, and are of far greater puncture strength, than masses produced from ordinary latex or the like, as also masses which are remarkable for their extraordinary transparency. Thus the sphere of application for latex products is substantially extended by the discovery of the method according to the present invention, so as to include purposes for which non-swelling masses, and masses having little or no electric conductivity, as also transparent masses are required. Masses produced by the present method may be added or admixed, in the form of pure caoutchouc sols, to other substances, to yield masses widely differing from ordinary caoutchouc masses as regards their properties. By varying the additions used it is also possible to build up novel types of latex or the like having different mechanical and other properties.

In the practicing of the method according to the invention electric current is passed through the dispersion, the dispersion being separated from the electrodes by diaphragms or the like septa, so that the processes in the dispersion are separated from the processes at the electrodes, thus eliminating electrolytic action on the dispersion.

A suitable form of the method according to the invention is one in which the dispersion is subjected periodically to a reversal of the current acting upon it, for which purpose the periods may be varied in length. This form of the method is based upon the discovery that if a dispersion be subjected, in the course of the electro-decanting method according to the present invention, to the action of an electric current flowing for a long time in one direction it can easily come about that, in consequence of the conveying of the colloids to the diaphragms, colloidal particles become attached to these latter, with the result that the effectiveness of the diaphragm is impaired and the process of stratified separation of the constituents of the dispersion disturbed.

Periodical and preferably rhythmical reversal of the current has the effect of carrying away or detaching from the diaphragms any colloidal particles which may have lodged thereon, that is to say of preventing altogether the collecting of colloid particles on the diaphragms. With a method of this nature, in which the direction of flow of the current is constantly being reversed, electro-dialysis of the ions is also practically inhibited or continuously undone. At the same time any tendency to congestion of ions at the diaphragm, with its harmful reaction upon the colloids, is avoided. The layer formation then takes place unimpeded and uniformly at both diaphragms alternatingly.

It is a surprising peculiarity of the electro-decanting method according to the invention that reversal of the current does not undo the work done in the preceding cycle, but allows the process to continue unchecked, whereas in the case of electro-dialysis the ions removed by the reversal of the current are brought back again into the solution to be purified, and likewise in the case of electro-osmosis the work of dehydration is also undone when the current is reversed.

It is thus possible for example to pass current for 12 hours on end, with reversal of the current every minute, through a caoutchouc emulsion, and thus completing the electro-decanting. On the other hand, for example in the case of electro-osmosis, a reversal of the current may not be effected during the process but only after the conclusion thereof, and after the apparatus has been charged afresh, that is to say only between two separate working cycles.

The dispersion to be treated may also be repeatedly subjected to the method according to the invention, and very thorough purification and concentration of the caoutchouc sols can thereby be achieved. In this case the procedure is such that from the caoutchouc sol there is each time separated off the formed layer and replaced by a fresh dispersion means, for example by ammoniacal water, after which the sol to which a fresh dispersion means has thus been added is again exposed to the action of electric potential, and this cycle of operation repeated until the desired degree of purification and concentration is attained.

With this form of the method the purification is thus effected by replacing the separated off liquid by a pure liquid.

In the accompanying drawing there is shown diagrammatically a type of apparatus for carrying out the method according to the invention, for example in handling ammoniacal latex, an electro-dyalising set being taken as the basis of the diagrammatic representation.

Referring to the drawing, the apparatus consists of a plurality of cells 1, 2 and 3, which are separated from each other by diaphragms 4. The innermost cell 1 serves to hold the caoutchouc dispersion to be treated, while the two outer cells 2 and 3 are filled with ammonia of the same concentration as the ammonia in the latex to be treated. In the lateral cells 2 and 3 there are immersed the electrodes 5 and 6, respectively, which consist of material which is proof against attack. In the constructional example shown in the drawing the electrodes are disc-shaped and parallel to the diaphragms. The current thus flows in a horizontal direction.

If the dispersion in the middle cell be exposed to the action of an electric current the dispersion, which is so separated from the electrodes 5, 6 by the diaphragms 4 that the processes occurring in the dispersion are perfectly independent of the processes occurring at the electrodes, is divided into two superposed layers of liquid, the influence of gravity resulting in the specifically lighter caoutchouc colloids collecting at the top and the specifically heavier protein colloids and electrolytes at the bottom. This separation into two superposed liquid layers, occurs with as low strengths of field as for example 0.1 to 1 or 2 volts per centimetre. Great field strengths may even bring about disturbances in the stratification process and thus be harmful to the carrying out of the electro-decanting method according to the invention.

The top layer may readily be separated from the lower by decanting.

It is preferable to work with dilute solutions, and the more dilute the solution is the greater the degree of purification achieved.

The layer containing the caoutchouc colloids may also be subjected repeatedly to the described method, the procedure being to add to this layer a fresh dispersion means (for example water, and preferably water containing an addition of ammonia), and to pass electric current once more through this solution, which procedure may be repeated as often as desired.

When working with periodically reversing of the current the frequency of the reversing depends on the speed of migration of the colloid particles and on the strength of the field, and may be the higher the greater the speed of migration and the greater the strength of the field is. Fields of greater strength, and of a strength amounting even to a multiple of those named, may be employed without giving rise to trouble, and by doing so the electro-decanting method according to the invention can be very considerably speeded up.

In the practising of the method it is best to use direct current, since the frequency of the usual alternating currents of 25 or 60 cycles per second has proved to be too high for the inertia of the stratification process.

*Example*

Assuming the use of apparatus of the type described and shown in which the electrodes are 12 cm. in diameter and vertically disposed, and in which the middle cell having a capacity of 3 litres is filled with caoutchouc emulsion containing 3% of ammonia and exposed to the action of an electric field the strength of which is 1.8 volts/cm., in which case the rate of flow of the current depends on the conductivity of the liquid, clear stratification begins to become established after 50 minutes. After 10 hours approximately 1½ litres of sol have become separated off with the proteins and impurities. If the starting concentration of the caoutchouc dispersion was 15% a caoutchouc concentration of 60% is attained in the top layer after stratification. It is advantageous to fill the outer cells with a solution in which the ammonia concentration is the same as in the inner cells.

What we claim is:

1. A method of purifying and concentrating natural and artificial aqueous rubber dispersions which comprises disposing such dispersions between upright diaphragms permeable to electric current, which diaphragms also separate said dispersions from electrodes, passing a periodically reversing electric current between the electrodes through the dispersions, which current is insufficient to deposit rubber from said dispersions in a solid state, the path of said current being substantially horizontal and the periodicity of such reversal being materially less than 25 cycles per second, continuing the electrical treatment of said dispersions until stratified separation of the colloids into superposed, free, floating layers according to specific gravities is effected while retaining the colloidal character of the substances contained in the dispersions, and then separating the superposed liquid layers formed thereby.

2. A method of purifying and concentrating natural and artificial aqueous rubber dispersions, which comprises disposing such dispersions between upright diaphragms permeable to electric current, which diaphragms also separate said dispersions from electrodes, passing a periodically reversing electric current between the electrodes through the dispersions, which current is insufficient to deposit rubber from said dispersions in a solid state, the path of said current being substantially horizontal and the periodicity of such reversal being materially less than 25 cycles per second, continuing said electrical treatment of the dispersions until stratified separation of the colloids into superposed, free, floating layers according to specific gravities is effected while retaining the colloidal character of the substances contained in the dispersions, separating the superposed liquid layers formed thereby, adding fresh dispersions means to the layer containing the rubber sol, and repeating the electrical treatment upon such layer to which the fresh dispersion means has been added.

3. A method of purifying and concentrating natural and artificial aqueous rubber dispersions containing ammonia, which comprises disposing such dispersions between upright diaphragms permeable to electric current, which diaphragms also separate said dispersions from electrodes immersed in ammonia of the same concentration as the ammonia contained in the dispersions, passing a periodically reversing electric current from the electrodes through the dispersions, which current is insufficient to deposit rubber from said dispersions in a solid state, the path of said current being substantially horizontal and the periodicity of such reversal being materially less than 25 cycles per second, continuing said electrical treatment of the dispersions until stratified separation of the colloids into superposed, free, floating layers according to specific gravities is effected while retaining the colloidal character of the substances contained in the dispersions, and separating the superposed liquid layers formed thereby.

4. A method of purifying and concentrating natural and artificial aqueous rubber dispersions, which comprises disposing such dispersions in a highly diluted condition between upright diaphragms permeable to electric current, which diaphragms also separate said dispersions from electrodes, passing a periodically reversing electric current between the electrodes through the dispersions, which current is insufficient to deposit rubber from said dispersions in a solid state, the path of said current being substantially horizontal and the periodicity of such reversal being materially less than 25 cycles per second, continuing said electrical treatment of said dispersions until statrified separation of the colloids into superposed, free, floating layers according to specific gravities is effected while retaining the colloidal character of the substances contained in the dispersions, and then separating the superposed liquid layers formed thereby.

WOLFGANG PAULI.
PAUL STAMBERGER.